United States Patent [19]

Bolgiano et al.

[11] 4,263,556
[45] Apr. 21, 1981

[54] MONOSTABLE SYSTEM

[75] Inventors: Duane R. Bolgiano, Bala Cynwyd; Joel M. Benjamin, Jr., Pottstown; Victor Meyer, Jr., Telford, all of Pa.

[73] Assignee: International Mobile Machines Incorporated, Bala Cynwyd, Pa.

[21] Appl. No.: 951,736

[22] Filed: Oct. 16, 1978

Related U.S. Application Data

[62] Division of Ser. No. 755,615, Dec. 29, 1976, Pat. No. 4,130,731.

[51] Int. Cl.³ ............................................. H03K 3/033
[52] U.S. Cl. .................................. 328/207; 307/273; 328/48
[58] Field of Search ................ 307/273, 265; 328/207, 328/48

[56] References Cited

U.S. PATENT DOCUMENTS

| | | | |
|---|---|---|---|
| 3,576,496 | 4/1971 | Garagnon | 307/273 X |
| 3,768,026 | 10/1973 | Pezzutti | 307/273 X |
| 3,840,174 | 10/1974 | Craft | 328/48 X |

Primary Examiner—John Zazworsky
Attorney, Agent, or Firm—Arthur A. Jacobs

[57] ABSTRACT

A monostable system utilizable in a portable radio telephone network, comprising a phase detector coupled to a counter; the phase detector receiving incoming signals and acting to control the functioning of the counter in accordance with the polarity of the phase detector.

1 Claim, 1 Drawing Figure

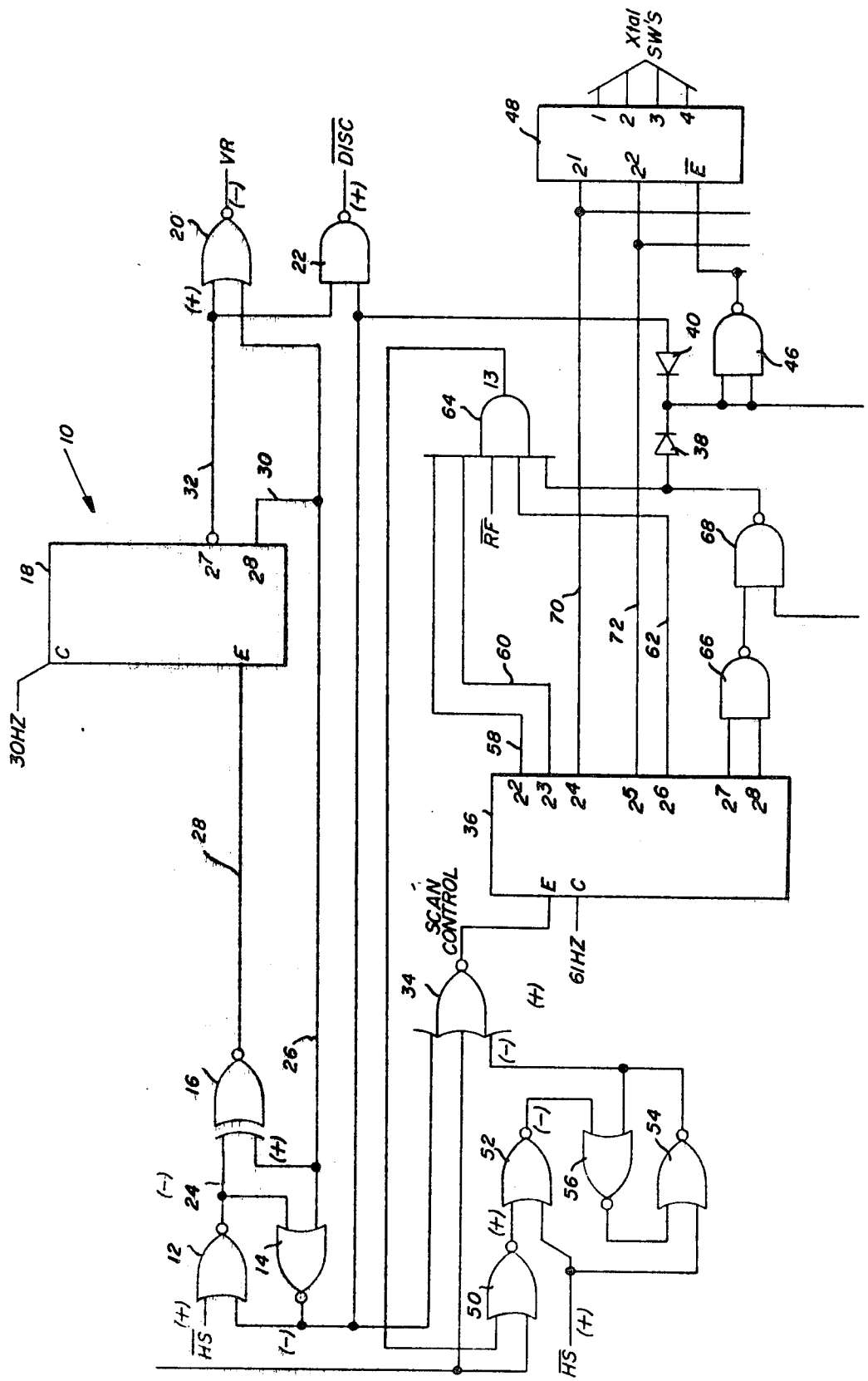

MONOSTABLE SYSTEM

This is a division of application Ser. No. 755,615, filed Dec. 29, 1976 and now issued as U.S. Pat. No. 4,130,731, dated Dec. 19, 1978.

This invention relates to a monostable system, and it particularly relates to a monostable system utilizable in a radio network such as used in a portable telephone system.

The radio-telephone network includes a base station and a plurality of subscriber stations. Each subscriber station has a transmitter and a receiver network. The receiver network includes a scanning means for periodically scanning a plurality of channels to determine when a channel is available for communication between the subscriber station and the base station.

Many portable systems of this type require constant receiver scanning to find an appropriate channel of communication with the base station. However, if the system can be adapted to use interrupted receiver scanning, wherein the receiver is on for only a small portion of the time, the saving in battery power could clearly be very significant; and this is important in order to keep the batteries small and yet avoid constant replacement or recharging. But when a channel is found and communication is established, it is necessary to keep the receiver on without interruption.

It is, therefore, an object of the present invention to provide a radio-telephone system which uses interrupted scanning power but wherein the power is enabled to remain continuously on when communication is established.

Another object of the present invention is to provide a system of the aforesaid type wherein undesirable variations in the activating network are suppressed.

Another object of the present invention is to provide a system of the aforesaid type which utilizes a monostable system to control the power input.

Another object of the present invention is to provide a system of the aforesaid type which is compact, relatively simple in construction and relatively inexpensive.

Other objects of the present invention will be readily appreciated as the same becomes better understood by reference to the following description when read in conjunction with the accompanying drawing wherein the single FIGURE is a schematic view of a monostable system embodying the present invention.

In accordance with the present invention, a 4-second monostable, generally designated 10, comprises NOR gate 12, NOR gate 14, exclusive NOR gate 16, counter 18, NOR gate 20 and NAND gate 22. Gates 12 and 14 constitute a flip-flop, while the exclusive OR gate 16 constitutes a phase detector which acts to suppress unwanted variations in the activating signals.

In operation, when line $\overline{HS}$, the control signal, becomes negative, the input line 24 to gate 16 becomes positive. Since the input line 26 is also positive, the input line 28 of the counter 18 becomes positive, thereby enabling the counter 18 to count 30-Hz pulses from a clock system until such time as the $2^8$ power output of the counter, shown at 30, becomes different from the input line 24 of gate 16, at which time the counter is again disabled. Since during that period the output 30 of counter 18 is positive, no output is produced via gate 20 to line VR. Similarly, since the output of gate 14 is negative, the output of gate 22 remains positive. If the hook switch (not shown) should bounce, the 4-second period merely takes a little longer.

When the handset (not shown) is placed on-hook, making line $\overline{HS}$ positive, the inputs of the exclusive NOR gate again becomes the same, thereby enabling the counter, which then continues to count until the inputs differ from each other. However, this time, the output 30 of the counter is negative so that when $2^7$ output from the counter, indicated at 32, becomes positive, gate 20 is activated to operate a voice relay (not shown). In addition, since the output of gate 14 is now positive, gate 22 becomes negative when the output 32 of the counter is negative, so that line $\overline{DISC}$ becomes negative for the purpose of transmitting tones. A NOR gate 34, is connected to the counter 36, to prevent scanning thereby.

At the same time, the output of gate 14 is transmitted to a transistor (not shown) via a diode OR gate consisting of diodes 38 and 40 biased by a pair of resistors (not shown), whereby negative power is supplied by the collector of the transistor to the receiver. The output of the diode OR gate is also connected to a gate 46, acting as an inverter, the output of which is connected to a decoder 48. NOR gate 50 and NOR gate 52 act as detectors while NOR gates 54 and 56 represent a flip-flop.

A separate strobe line is not actually used in this system. Instead, the $2^2$, $2^3$ and $2^6$ outputs of counter 36, which are respectively indicated at 58, 60 and 62, are combined directly with line $\overline{RF}$ and AND gate 64. A NAND gate 66 combines the two outputs, indicated at $2^7$ and $2^8$ in counter 36, to produce an output from the gate one-fourth of the time, thereby providing a 25% scanning ratio. In addition, NAND gate 68 plus the diode OR gate 38-40 activate the transistor (not shown) to provide negative power to the receiver. The output of the diode gate is, furthermore, inverted by NAND gate 46, operating solely as an inverter, to turn on a transistor (not shown), whereby positive power is supplied to the receiver.

The counter 36 counts in binary, and the $2^4$ and $2^5$ outputs thereof, respectively designated 70 and 72, are decoded by the decoder 48 to provide the scanning functions of a pair of crystal switches (not shown). If decoder 48 were to remain enabled, the crystal switches would be scanned as a continuous function; therefore, when the handset is taken off-hood, making HS negative, the decoder 48 is enabled on a continuous basis, whereby a free channel can be found immediately rather than after a wait of three seconds.

We claim:

1. A monostable system comprising a source of control signal applied to a flip flop formed of cross coupled NOR gates, said flip flop having an output which is applied to an input of an exclusive NOR gate, an output of the exclusive NOR gate being connected to provide an enable signal to a counter, said counter thereby being enabled to count pulses from a clock system connected thereto, said counter having a pair of outputs connected as inputs to a NOR gate, the output of said NOR gate providing the output of said system, one of said pair of outputs being connected as a second input to the exclusive NOR gate and as an input to the flip flop.

* * * * *